United States Patent Office 3,115,511
Patented Dec. 24, 1963

3,115,511
IRON CHELATE COMPOSITIONS
John J. Singer, Westboro, Mass., and Mark Weisberg, Providence, R.I., assignors, by mesne assignments, to Hampshire Chemical Corporation, Providence, R.I., a Corporation of Delaware
No Drawing. Filed Apr. 17, 1957, Ser. No. 653,307
7 Claims. (Cl. 260—439)

This invention relates to an improved physical form of iron chelates for use in agricultural compositions and fertilizers and other situations where such materials have application.

It is a well annotated observation that addition of chelated iron to soil is a valuable treatment for overcoming chlorosis in plants. Early work was done with the sodium ferric chelate of ethylenediaminetetraacetic acid, which compound and several related ones are in widespread current use.

The iron chelates as now made and used are dry powders, extremely soluble in water, but very dusty in the dry form. This combination of dustiness with the high solubility leads to damage to tree or plant foliage and blemishes on fruits or flowers when the powder is applied to soil, simply because the powder brings about spotting when it contacts foliage. Current practice in the manufacture of iron chelates consists of adding ferric chloride or ferric sulfate to a water solution of the sodium salt of ethylenediaminetetraacetic acid. Concentrations are high and a precipitated crystalline compound is filtered out and dried. Because the sodium iron chelate is very soluble in water, as much as 5 to 10 percent of the product is lost in the filtrate.

The method of manufacture, of course, also results in the contamination of the product with sulfate and chloride which are deleterious to soil and in some cases may actually poison the soil, thereby seriously restricting the use of the iron chelate so prepared.

To overcome the dustiness of the iron chelate several methods have been tried, such, for example, as pelletizing the product. However, handling of the pellets in transportation and during mixing with fertilizer causes abrasion which again produces dusting.

A second technique of preparation of the iron chelate has been to mix the solution of sodium ethylenediaminetetraacetic acid with vermiculite and to add the iron salt to form the iron chelate on the vermiculite surfaces. This product has a materially reduced dustiness but the vermiculite is a diluent and the iron concentration in the finished product cannot be made higher than about 8 to 9 percent. The product is bulky and causes extra expense in packaging and in transportation.

It is, accordingly, a fundamental object of this invention to provide iron chelates of polyamino polycarboxylic acids in an improved physical form which is characterized by its being non-dusty, its freedom from contaminating sulfates or chlorides, and its high iron content.

It is another object of the invention to provide iron chelates of polyamino polycarboxylic acids of improved form in a urea-formaldehyde fertilizer composition useful for direct application to soil, such that highly soluble iron chelate is not lost by rapid leaching from the soil.

Other objects and advantages of the invention will in part be obvious and in part appear hereinafter.

We have found that the acid form of the iron chelate of most polyamino polycarboxylic acid chelating agents is not only sparingly soluble but that it can be prepared with high iron content, with essentially no tendency to cause damage to tree or plant foliage when applied to soil in the treatment of iron chlorosis. The acid iron chelate can be made easily and quickly by direct reaction between a mole of the amino acid itself and a mole of powdered iron, in the presence of a small quantity of water, employing a minimum amount of heat to cause the reaction to go to completion. For example, the grade of iron used in molding and sintering operations in powder metallurgical techniques is commercially available, cheap, and very satisfactory for our purposes. The neutralizing reaction between the amino acid and the powdered iron goes to completion quite rapidly and a thick slurry of the acid iron chelate is formed. A further advantage of the process results from the fact that during the reaction hydrogen is released and all the iron reacted appears in the chelate in the ferrous form. Moderate agitation of the mixture during the reaction with gentle application of heat results in the production of a dry granular material which has about 16.1 percent of iron in the chelated form.

The iron chelates in the acid form thus prepared may be made more useful for agricultural purposes by treating the wet slurry with potassium bicarbonate in stoichiometric amounts for full neutralization or less to bring the product to the degree of neutralization desired, so that, not only is iron made available but also potassium is in the product and is simultaneously made available.

As a further modification of the product we prepare it in combination with a urea-formaldehyde resin carrier.

The process of making acid iron chelate consists generally of the following steps:

(1) First, making a water slurry of the particular amino acid which is to be used with iron powder of about 100 to 300 mesh, or finer.

(2) Second, agitating the slurry mildly and warming it to induce dissolution of the iron to form the iron chelate.

With stoichiometric quantities, an iron chelate containing substantially the theoretical formula amount of iron is produced. The product is dense, granular, free-flowing when dry and can be packed quite economically; it is sparingly soluble in water. That is, a maximum level of solubility is about 3½ percent by weight; it is so dense that it has only a very slight tendency to form dust and burn leaves and fruit.

The compound formed is white to greenish brown. When conditions of preparation are such that all oxygen is effectively excluded, the hydrogen atmosphere results in the production of the chelate in ferrous form, which is white. Various degrees of oxidation of the iron will cause the color to vary to greenish brown, in which case the iron is present in the ferric form. Actually atmospheric oxygen aids greatly in speeding the reaction between iron and the acid chelating material.

The alkali metal and ammonium salts of the chelates are readily formed by neutralizing or partially neutralizing the acid chelate with the corresponding alkali. For agricultural purposes, potassium and ammonia are the preferred salts. They are formed simply by adding appropriate amounts of potassium carbonate, bicarbonate or hydroxide to the slurry in which the iron chelate is being formed to produce the mono- or di-salt. Similarly, an appropriate stoichiometric amount of ammonia water to form the mono- or di-ammonium salt may be used.

The details of the technique of preparing the preferred form of iron chelate will be understood from the following examples indicating representative amino acids which are used for making chelated iron for agricultural purposes and also typical conditions of operation.

EXAMPLE I

One mole (292 parts by weight) of ethylenediaminetetraacetic acid was added to 60 parts by weight of water together with 56 parts by weight of 100 to 300 mesh iron powder. The mixture was stirred (with or without heat)

until the iron was completely dissolved. The cessation of visual liberation of hydrogen or swelling of the reaction mix or a change in color due to surface oxidation of the ferrous iron chelate to the yellow-green or red iron chelate may be taken as an indication of the end of the reaction. When the iron was completely dissolved and hydrogen no longer being liberated, the product was dried. A theoretical yield of 345 parts was obtained; i.e., recovery of virtually 100 percent of material used was realized.

If the acid iron chelate as such is to be used the dried product at this stage is quite satisfactory. It forms as a coarse granular material, quite free-flowing, which is easily handled and is characteristically quite free from dust.

EXAMPLE II

The product prepared as in Example I, and 100 parts of potassium bicarbonate is gradually introduced. When all the carbon dioxide is eliminated, the product is dried to give KFe EDTA. A theoretical yield of 383 parts was obtained; again the yield represented a complete recovery of material used in the process.

The product is a coarse, granular free-flowing material, quite dense, which is easily packed and characteristically showers little dust.

EXAMPLE III

To a slurry of Fe EDTA, prepared as in Example I, a mixture of 60 parts of urea and 120 parts of 37 percent aqueous formaldehyde is added. A vigorous reaction takes place, and the urea formaldehyde polymer is completely formed in situ within 15 minutes. The product is then dried and crushed to give a bulky, granular resin fertilizer useful for application to soil as a source of nitrogen or iron.

The polymerization of urea with formaldehyde under acid conditions, i.e., at pH of about 4.5 or lower, is the method by which agricultural grades of the polymer are made. They represent a good source of nitrogen when used as fertilizer. The acid form of the iron chelate of Example I has a pH of about 4, which is just about ideal for forming the resin.

EXAMPLE IV

Proceeding as in Example III, 20 to 40 parts of polyethylene glycol is added to the slurry before adding the urea formaldehyde solution. Paraformaldehyde may be substituted for formaldehyde to eliminate the introduction of water and thereby make the drying of the product more economical. This product containing the humectant polyethylene glycol is completely non-dusting.

EXAMPLE V

One hundred ninety-one parts of nitrilotriacetic acid and 60 parts of water are mixed and stirred with 56 parts of 100 to 300 mesh iron powder until the iron is completely dissolved. The product is then dried to give a theoretical yield of 244 parts of the iron chelate of nitrilotriacetic acid.

EXAMPLE VI

The same procedure as Example V is carried out with 1 mole of urea and formaldehyde added to produce the resin polymer.

Since the acid form of the iron chelate of nitrilotriacetic acid has a pH of less than 4.5, it is in an optimum range to serve as the polymerization catalyst for the urea formaldehyde reaction.

The bulky product is crushed to give a granular, non-dusting resin suitable for use as a nitrogen fertilizer which is also a source of iron.

EXAMPLE VII

Further to improve the non-dusting characteristics of the product we add small amounts in the range from about 1 percent to about 5 percent by weight of binders or humectants such as polyglycols, gums, gelatin, glycerine and molasses to the products. The only purpose of the humectant is to provide a trace of material having a high affinity for water, sufficient to absorb or hold enough water to moisten the particles of the fertilizer. Thus any one of the iron chelate compounds described in the preceding examples may be modified by adding the humectant to the reaction mix, as the iron and amino acid are being reacted. The appropriate amount of the binder, generally, is about 3 percent by weight.

EXAMPLE VIII

A dried product containing only a small amount of water may be prepared by moistening 292 parts of ethylenediaminetetraacetic acid with 100 parts of 37 percent aqueous formaldehyde. After the iron has dissolved, 75 parts of powdered urea is added and stirred rapidly into the slurry. In a few seconds polymerization of the urea with the formaldehyde occurs and the mass increases in volume by about 50 percent. Also polymerization to form the resin releases some heat which expels last traces of hydrogen. It also generates some steam bubbles in the mass. The expanded mass has the appearance of a sponge or spongecake which has little strength and is easily crushed with little pressure. Here also to minimize dusting which may occur if the product becomes excessively dried out, the humectant as indicated in Example VI may be added. Generally speaking for the preparation of the iron chelate product carried on the urea formaldehyde resin the ratio of formaldehyde to urea is about 1.5 moles of formaldehyde to 1 mole of urea to form the preferred polymer for agricultural purposes. The proportion of the iron chelate with this resin may vary within any desired limits. Although some internal combination occurs the materials together form a combined fertilizer which is rich in ingredients useful for agricultural purposes.

Following the techniques given in the examples virtually any amino acid iron chelate may be prepared by the method outlined. In the following tabulation the compositions of the products formed from the identified amino acids are given.

*Table*

| Chelating Agent | Iron Content of Chelate | Molar Ratio, Chelating Agent to Iron |
|---|---|---|
| Ethylenediaminetetraacetic acid | 16.1 | 1:1 |
| Monohydroxyethylethylenediaminetriacetic acid | 16.85 | 1:1 |
| Diethylenetriaminepentaacetic acid | 12.6 | 1:1 |
| Nitrilotriacetic acid | 22.9 | 1:1 |
| Monohydroxyethyldiglycine | 24.2 | 1:1 |
|  | 13.8 | 2:1 |
| Dihydroxyethylglycine | 25.7 | 1:1 |
|  | 18.5 | 3:2 |

The acid iron chelates with or without carriers or with or without the urea formaldehyde resin component are efficient sources of iron for soil which needs the treatment. They have the advantage that their solubility is so low they are not leached from the soil by heavy rainfall. The manner of formation produces a dense product which is not prone to form dust, but the dust, if formed is harmless because of its low solubility. That is, any dust that reaches the plant or foliage is likely to be carried off physically by rainfall to the soil before it goes into solution.

The acid iron chelates as such and their salts are compatible with all commonly used fertilizers and fertilizer ingredients. Accordingly, used direct or with carriers or in any fertilizer as an additional component they are placed in an environment which is beneficial to the soil. The prime virtue of the compounds is of course their 100 percent activity, because the iron content and the organic portions are available for assimilation.

Where the iron chelate is prepared with a urea formaldehyde resin carrier, the resin is easily made of optimum solubility for fertilizer purposes. Urea and formaldehyde form insoluble or sparingly soluble resin when polymerized in acid solutions. If the polymerization is carried out in alkaline solutions the polymer is quite soluble. The conventional method of making the agricultural urea-formaldehyde compounds is to react the two reactants in a solution of controlled pH and temperature. The exact degree of solubility is obtained by rapid neutralization or chilling when the proper molecular weight and degree of cross linking has been obtained.

Running the polymerization in the presence of the iron chelate offers reaction conditions which give a product having solubility characteristics suitable for agricultural use. Those made at pH 4–5 are of optimum solubility for agricultural use and since the acid form of iron chelate gives pH of about 4–4.5, polymerization of urea and formaldehyde in the presence of the iron chelate gives a urea form resin of optimum solubility.

It is apparent that the actual bulk density of the product may be varied in accordance with the preparation. Crushing, pelleting etc., make possible a product with virtually any desired form.

Though the invention has been described with only a limited number of examples, it is to be understood that variations thereof may be practiced without departing from its spirit or scope.

What is claimed is:

1. The method of preparing the iron chelate of a polyamino carboxylic acid chelating agent which has limited solubility in water which comprises wetting the solid polyamino carboxylic acid with an aqueous medium, the amount of said medium being insufficient to dissolve said reactant and product, incorporating in said medium a predetermined proportion of finely divided iron, agitating said moist mixture of solids to induce reaction between the polyamino carboxylic acid and the iron, said reactants and product being largely in the solid phase, thereby to form the iron chelate, and drying said iron chelate thereby to form a dry dense, granular product.

2. The method in accordance with claim 1 in which a humectant is added to the aqueous medium.

3. The method in accordance with claim 1 in which the chelating agent is ethylenediaminetetraacetic acid.

4. The method in accordance with claim 1 in which the chelating agent is monohydroxyethylethylenediaminetriacetic acid.

5. The method in accordance with claim 1 in which the chelating agent is diethylenetriaminepentaacetic acid.

6. The method in accordance with claim 1 in which the chelating agent is nitrilotriacetic acid.

7. The method in accordance with claim 1 in which the chelating agent is diethanolglycine.

References Cited in the file of this patent

UNITED STATES PATENTS

| | | |
|---|---|---|
| 2,157,767 | Long | May 9, 1939 |
| 2,279,200 | Keenen | Apr. 7, 1942 |
| 2,508,490 | Calvin et al. | May 23, 1950 |
| 2,766,107 | White | Oct. 6, 1956 |
| 2,816,060 | Carter | Dec. 10, 1957 |

OTHER REFERENCES

King et al.: "Fundamentals of College Chemistry," second edition (1954), page 93.

Martell et al.: "Chemistry of the Metal Chelate Compounds," pp. 514 to 558 (1952).